United States Patent [19]
Udelle et al.

[11] Patent Number: 5,529,017
[45] Date of Patent: Jun. 25, 1996

[54] PIVOTING BALL AND TRACK TOY FOR PETS

[76] Inventors: Steven D. Udelle; Laura L. Udelle, both of 26414 Barranquilla Ave., Punta Gorda, Fla. 33983

[21] Appl. No.: 496,515

[22] Filed: Jun. 29, 1995

[51] Int. Cl.$^6$ .................................................. A01K 29/00
[52] U.S. Cl. ............................ 119/707; 119/706; 446/168
[58] Field of Search .................................. 119/702, 706, 119/707, 711; 446/131, 136, 168, 170

[56] References Cited

U.S. PATENT DOCUMENTS

| | | | |
|---|---|---|---|
| 1,789,333 | 1/1931 | Da Costa | 119/707 |
| 3,080,167 | 3/1963 | Hansard | 446/170 |
| 3,080,675 | 3/1963 | Licitis | 446/170 |
| 4,577,590 | 3/1986 | Skroch | 119/706 |
| 4,722,299 | 2/1988 | Mohr | 119/707 |
| 5,009,193 | 3/1991 | Gordon | 119/707 |

*Primary Examiner*—Todd E. Manahan

[57] ABSTRACT

An animal action and claw scratching device comprises a movable track ring 12 confining a ball 20 within its U-shaped cavity 14, and includes a pair of axles 22 protruding outward from the track ring 12. The track ring 12 surrounds a stationary platform housing 10, and is connected by mating axles 22 through openings 24 in the vertical sides of the stationary platform housing 10. A portion of the track ring 12 floor surface 15 has a brief incline 17 at opposite ends of track ring 12 to provide a left or right off center of ball 20 when at rest in respect to the axles 22. An electronic sound synthesizer assembly 8 is concealed within the platform housing 10.

4 Claims, 3 Drawing Sheets

PIVOTING BALL AND TRACK TOY FOR PETS

FIELD OF THE INVENTION

The present invention relates to devices that provide an animal with a form of self initiated activity, such as a movable object and claw scratching device, but more particularly with a substantially improved movable object action, such as a ball and track capable of provoking an animal into imminent play with the device for extended periods of time.

BACKGROUND-DISCUSSION OF THE PRIOR ART

U.S. Pat. No. 5,269,261 by McCance, Dec. 14, 1993 shows a track and ball with a corrugated cardboard claw scratching means. Applicants have purchased this device and other ball track devices. The pet owner has to participate in moving the ball before a cat will join in. When the cat is claw scratching, the ball remains motionless and therefore does not present the incentive of motion. These purchased devices are seldom used, unless a human forces the ball into play. The prior art does not teach on the use of a motivational means that would exhibit an irresistible incentive or attraction to an animal, whereby the animal would benefit from increased use of the device more often.

SUMMARY OF THE INVENTION

The present invention takes advantage of the inherent instincts and curiosity of an animal's response to sound and moving objects, when the original sound and movement of the object is not directly initiated by the animal or human hand, but by the device. Generally, the substantially improved present invention comprises a circular track ring that's sufficiently open for viewing a confined ball within its recess or U-shaped cavity. The open center area of the track ring surrounds a carpeted platform housing used for claw scratching. The circular track ring is connected to openings in the opposite perimeter vertical sides of the platform housing with insertion dowels or axles, allowing the track ring to tip or teeter around the stationary perimeter of the platform housing. Any slight downward pressure on the track ring assembly will cause the track ring to move or tip as an animal mounts the carpeted platform, thereby causing a ball within the U-shaped cavity to move. Whenever an animal mounts the device for claw scratching, the lure or ball will move due to the slight tipping of the track ring upon contact. The movement of the ball will produce a reaction from the animal, whereby chasing or swatting the ball is imminent. The lowermost portion of the improved track ring has a slightly raised surface within its interior floor, located midway between the axles on both opposite sides of the track ring. A very slight rise in the bottom floor surface of the U-shaped track ring will allow the ball to be positioned slightly left or right of the track ring's center, in respect to the axles. Applicants have found that balls and tracks are far from precision when molded, thus an out-of-round ball, or track variation is common and will cause the ball to remain stationary on many occasions, when the ball is centered within the track ring while at its highest point. The track ring floor surface has a very minimal incline at its centermost portion when at a fully raised elevation. By displacing the position of the ball right or left of center when the track ring is static or at rest, a positive movement of the ball will always be initiated when the track ring is elevated, due to the steeper incline presented under the ball's starting position. Precision is expensive in a product, and difficult when dealing with plastics of large thickness. A non-precision molded component would no longer present a handicap when the ball is displaced to the left or right of center as a starting position when at rest. Another method of displacing the ball is to have one dowel or axle slightly lower than the opposite axle when mated to the platform housing. An electronic sound synthesizer is included within the platform housing and powered by a battery through an on-off switch. When the switch is in the on position, the synthesizer will broadcast intermittent sounds at spaced intervals. The preferred sound is that of a mouse producing scratching noises inside of a wall or housing. This scratching sound is irresistible to a cat and will always draw the animal to the device. The animal's attempts at the elusive sound within the device housing, encourages a substantial amount of claw scratching, necessary for its species on the carpeted surface of the device. The ball within the track ring will move as an indirect result of the animal's efforts during claw scratching and contact with the track ring, thereby initiating further action from the animal.

It is therefore an object of the present invention to provide an improved animal action and claw scratching device that does not require any direct contact with a lure ball by an animal or human hand to initiate a provocative movement of the lure ball.

It is an object of the present invention to have an animal expend its surplus energy, thereby developing improved muscle tone, alertness, coordination, and better sleeping habits.

It is an object of the invention that upon mounting the device, a cat will always respond to the moving lure.

It is another object of the invention that the animal action and claw scratching device would relieve the animal from boredom by providing more frequenting, thereby saving areas of household furniture from claw scratching damage.

Still another object of the improved invention is to provide sound as an incentive to initiate frequent use of the device.

Another object of the present invention is to simulate nature; to satisfy the animal's natural curiosity and inherent hunting and stalking instincts in a safe and humane way, thereby keeping the animal happy, healthier, and more content.

Other objects and advantages may be readily determined by the following descriptions.

COMPLETE DESCRIPTION OF THE INVENTION

Figure 1A:
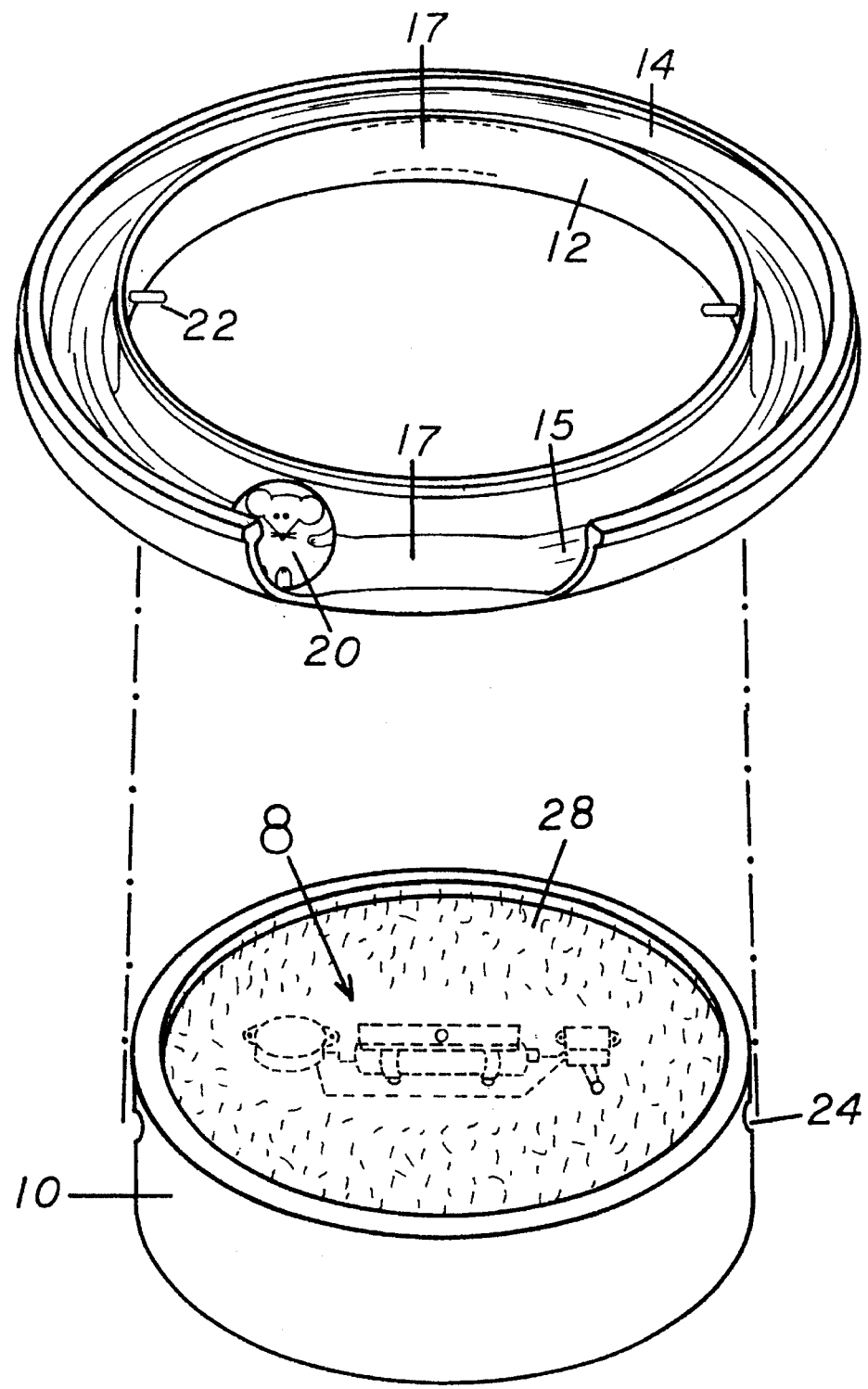
FIG. 1a is a perspective, exploded view in partial cutaway of the preferred embodiment of the present invention showing a ring containing a ball within its recess and a circular carpeted platform housing.

FIG. 1a is an exploded perspective view in partial cutaway of the preferred embodiment of the present invention, comprising a circular track ring 12 provided with a recess or U-shaped cavity 14 for confining a movable object or lure ball 20 within. The center housing assembly 10 has a carpeted claw scratching material 28. The outside vertical sides of the platform housing 10 contain openings 24 for insertion of dowels or axles 22 attached to the track ring 12. The track ring is sufficiently flexible for mating the dowels 22 to the housing openings 24. The track ring 12 surrounds the perimeter of the housing sides 10 and the only connection to the housing are the dowels or axles. These axles 22 serve as a fulcrum to permit the track ring to teeter or tip. An exaggerated rise 17 sloping upwards from the floor 15 of the U-shaped cavity 14 provides a left or right off-center to the lay of the ball 20 when static in respect to the two axles 22, thus allowing the ball 20 to be positioned where the track floor would have a steeper slope or incline when elevated. The off-center position of the ball 20 assures its immediate movement when that side of the track ring 12 is raised. When an animal's foot or body puts a slight pressure on the top of the track ring 12, the ring will tilt downward, causing the solid plastic ball 20 to begin an orbit. This indirect, provocative motion of the ball or lure produces an imminent response from an animal. When the animal is in the act of claw scratching on the carpeting 28 attached to the platform housing 10, any slight downward contact with the outer ring 12 will initiate movement of the ball 20. This concept of creating motion of a lure indirectly will provide more frequent use of the device and activity from an animal than relying on the human hand or animal directly moving a stationary lure on devices in current use. An electronic sound synthesizer assembly 8 is shown in hidden lines below the platform housing 10 and is described in FIG. 1c.

Figure 1B:
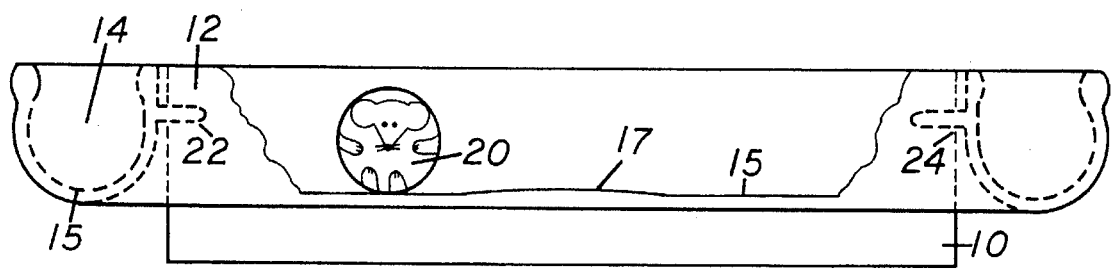
FIG. 1b is a partial cutaway plan front view showing a slight rise in the ring floor of the device.

FIG. 1b is a partial cutaway front plan view with partial hidden lines of the device as described in FIG. 1a, showing the raised area 17 in relation to the floor 15 of the U-shaped cavity 14 for better clarity.

Figure 1C:
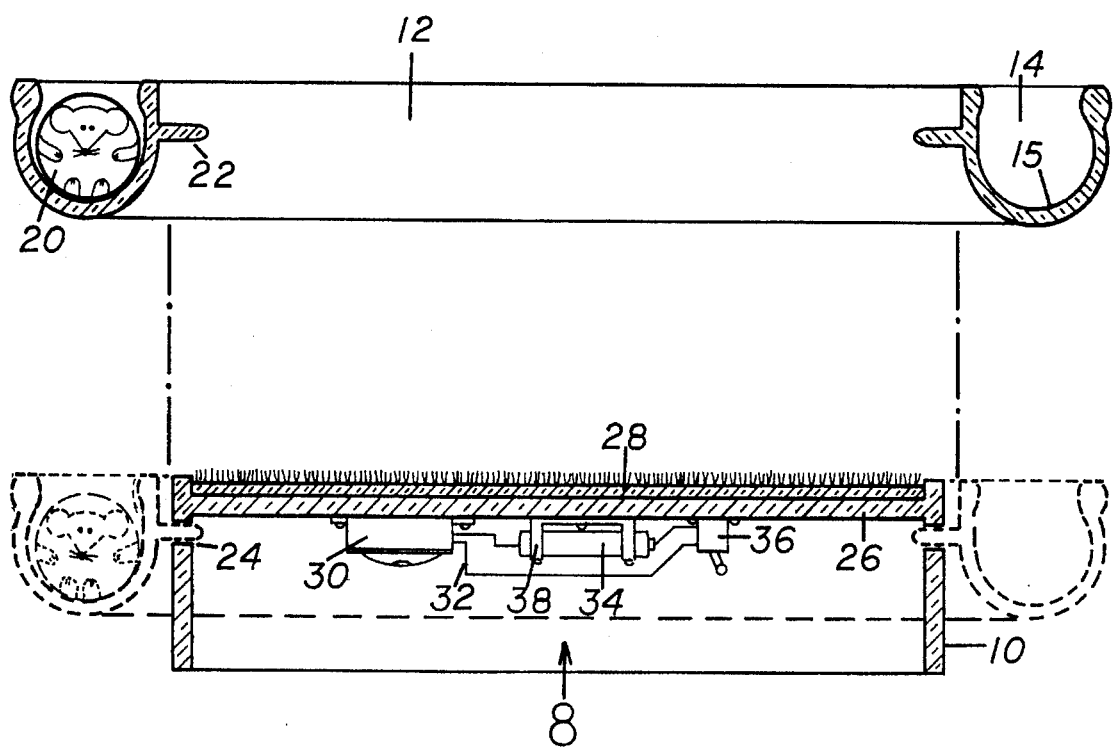
FIG. 1c is an exploded front plan view in cross section showing the device components and their relationship.

FIG. 1c is an exploded front plan view in cross section with partial hidden lines of the device as described in FIG. 1a, further disclosing an assembly 8 comprised of an electronic sound synthesizer 30, wiring 32, battery mounting clip 38, battery 34 and an on-off switch 36 fastened to the bottom side of platform surface 26 of platform housing 10. When the switch is on, the synthesizer 30 will broadcast intermittent sounds at spaced intervals at a sufficiently low decibel level. The preferred sound is that of a mouse producing scratching noises within an enclosed area. This particular scratching sound, when tested by applicants, proved to be the most effective. The cats would spend a great deal of time investigating, sniffing, and clawing at an enclosure emitting this sound. Other sounds or voices can be combined in the synthesizer 30 if desired. The battery 34 life is substantially long when used to power an intermittent sound synthesizer, thereby saving frequent battery replacement necessary on most other devices. The animal's attempts at the elusive sound within the device housing encourages a substantial amount of claw scratching, necessary for its species, on the carpeted surface of the device. The ball within the track ring will move as an indirect result of the animal's efforts during claw scratching and contact with the track ring, thereby initiating further action from the animal.

Figure 2A:
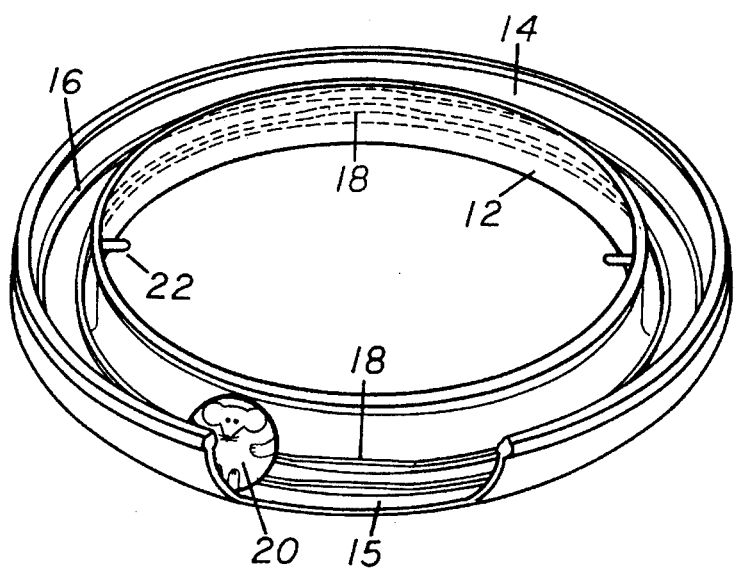
FIG. 2a is a perspective, exploded view in partial cutaway of an alternate embodiment of the present invention showing a pair of track rails.

FIG. 2a is a perspective view in partial cutaway of an alternate embodiment of U-shaped track ring. FIG. 2a is the same as described in FIG. 1a except that a pair of rails 16 extend upwards from the floor 15 of the U-shaped cavity 14. The rails extend still further upwards at both opposite ends of the track ring 12 as depicted by 18. The slight rise of the rails 18 will position the ball 20 left or right of the track ring 12 center, in respect to the axles 22 as fully described in FIGS. 1a and 1b. The rails present a very minimal surface contact to the ball's mass, thereby creating a more sensitive response to motion from the ball by the decreased surface contact friction.

Figure 2B:
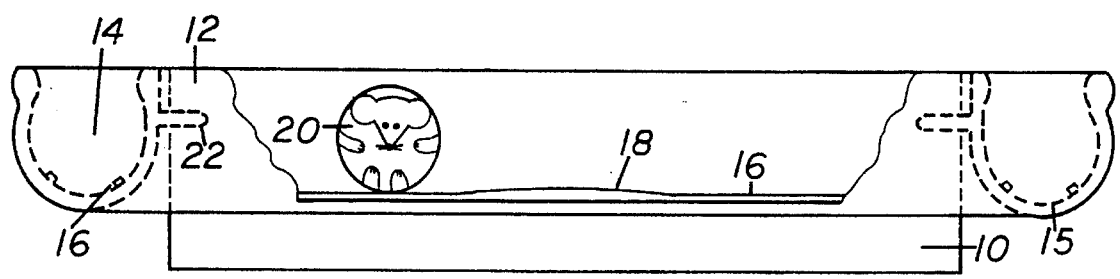
FIG. 2b is a partial cutaway front plan view showing a slight rise of the track rails on the ring floor of the device.

FIG. 2b is a front plan view in partial cutaway and partial hidden lines of the device as described in FIG. 2a, showing the elevated rails 18 in relation to the lower elevated rails 16 for better clarity.

It would be obvious to alter the shape or size of the platform scratching surface. For example, the platform scratching surface can be a hollow cone or cylinder shaped structure with an access opening to provide housing for the animal as well as serve as a vertical scratching surface.

CONCLUSION

Thus, it has been shown that the action of the present invention solves the shortcomings of passive devices, past and present, thereby satisfying the consumers investment with a realistic and more frequently used product. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal attractant toy and claw scratching device comprising:
    a) a circular base and having a substantially planar top surface supported by a vertically oriented peripheral sidewall extending downwardly therefrom;
    b) an annular ring forming a continuous track encircling said vertically oriented peripheral sidewall, said continuous track having an inner wall, an outer wall, a bottom, and an open top;
    c) an object disposed within said continuous track and freely movable therein;
    d) a pair of axles disposed at opposing points on said inner wall of said annular ring and extending along a diameter of said circular base, said axles extending outwardly from said annular ring toward said circular base and forming a pivot axis along said diameter;
    e) a pair of holes disposed at corresponding opposing points in said peripheral sidewall of said base, said axles being received within said holes and freely pivotal therein, said holes being disposed at a sufficient height on said peripheral sidewall such that said annular ring may pivot about said pivot axis; and
    f) a pair of upwardly sloped surfaces within said continuous track and disposed along the bottom of said annular ring, said upwardly disposed sloped surfaces being disposed on opposite sides of said annular ring along a diameter of said base which is orthogonal to said pivot axis.

2. An animal attractant toy and claw scratching device as set forth in claim 1, wherein said bottom of said annular ring is provided with a pair of spaced apart slightly elevated rails inside said continuous track upon which said movable object lies and said sloped surfaces are each formed by gradual rise in elevation of said rails.

3. An animal attractant toy and claw scratching device as set forth in claim 1, further comprising the interior of said circular base having an electronic sound synthesizer therein.

4. An animal attractant toy and claw scratching device as set forth in claim 3, wherein said electronic sound synthesizer broadcasts mouse related sounds therefrom.

\* \* \* \* \*